(12) United States Patent
Kim

(10) Patent No.: US 11,597,407 B2
(45) Date of Patent: Mar. 7, 2023

(54) VEHICLE CONTROL SYSTEM

(71) Applicant: SL Corporation, Daegu (KR)

(72) Inventor: Daehyung Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 245 days.

(21) Appl. No.: 17/012,554

(22) Filed: Sep. 4, 2020

(65) Prior Publication Data

US 2021/0188313 A1 Jun. 24, 2021

(30) Foreign Application Priority Data

Dec. 19, 2019 (KR) .................. 10-2019-0170525

(51) Int. Cl.
| | |
|---|---|
| *B60W 60/00* | (2020.01) |
| *B62D 1/183* | (2006.01) |
| *B60W 10/20* | (2006.01) |
| *B60W 10/10* | (2012.01) |
| *B60K 23/00* | (2006.01) |

(52) U.S. Cl.
CPC ........... *B60W 60/005* (2020.02); *B60K 23/00* (2013.01); *B60W 10/10* (2013.01); *B60W 10/20* (2013.01); *B62D 1/183* (2013.01)

(58) Field of Classification Search
CPC .... B60W 60/005; B60W 10/10; B60W 10/20; B60W 30/14; B60W 50/082; B60W 60/001; B60W 60/0051; B60W 60/0053; B60W 2050/007; B60W 2422/70; B60K 23/00; B60K 2370/126; B60K 2370/175; B60K 2370/782; B60K 37/06; B62D 1/183; B62D 1/02; F16H 59/12; F16H 59/08; F16H 2059/081; G05G 1/087; G05G 5/04; G05G 5/28; G05G 5/05; B60Y 2400/301; B60Y 2400/306
USPC .......................................................... 701/23
See application file for complete search history.

(56) References Cited

U.S. PATENT DOCUMENTS

| | | | |
|---|---|---|---|
| 10,877,508 B2* | 12/2020 | Miyazaki | ................. G05G 5/04 |
| 2017/0235305 A1* | 8/2017 | Jung | ...................... G05D 1/021 |
| | | | 701/23 |
| 2018/0177157 A1* | 6/2018 | Butler, III | ............ A01K 27/005 |
| 2018/0266550 A1* | 9/2018 | Kim | ..................... F16H 59/0278 |
| 2018/0318635 A1* | 11/2018 | Lee | ....................... A63B 21/156 |
| 2020/0047769 A1* | 2/2020 | Oguro | ............... B60W 60/0051 |
| 2020/0130733 A1* | 4/2020 | Hwang | .................. B62D 5/005 |

(Continued)

*Primary Examiner* — Jonathan M Dager
*Assistant Examiner* — Jean W Charleston
(74) *Attorney, Agent, or Firm* — United One Law Group LLC; Kongsik Kim; Jhongwoo Peck

(57) ABSTRACT

A vehicle control system includes a controller configured to determine whether a vehicle is operating in an autonomous driving mode or in a manual driving mode; and a steering device for adjusting a position of a wheel of the vehicle when the vehicle is operating in the manual driving mode. The steering device includes a knob configured to rotate about a rotation axis; a shaft connected to the knob, the shaft rotating about the rotation axis together with the knob by a rotational force transmitted from the knob; and an elastic part coupled to the shaft. In particular, when the shaft rotates from a reference position by the rotational force, the elastic part is compressed, and when the rotational force is removed, the elastic part is relaxed to return the shaft to the reference position.

18 Claims, 17 Drawing Sheets

(56) References Cited

U.S. PATENT DOCUMENTS

2020/0159212 A1\* 5/2020 Kuwabara ......... B60W 60/0053
2022/0136572 A1\* 5/2022 Blank ................. F16H 59/0217
74/473.3

\* cited by examiner

< MANUAL DRIVING MODE >

< AUTONOMOUS DRIVING MODE >

VEHICLE CONTROL SYSTEM

CROSS-REFERENCE TO RELATED APPLICATION

This application claims priority from Korean Patent Application No. 10-2019-0170525 filed on Dec. 19, 2019, which application is herein incorporated by reference in its entirety.

BACKGROUND

1. Technical Field

The present disclosure relates to a vehicle control system, and more particularly, to a vehicle control system including a steering device that includes a knob and a shaft configured to rotate about a rotation axis to adjust a position of a wheel of a vehicle.

2. Description of the Related Art

Generally, a steering device of a vehicle changes a proceeding direction of the vehicle in accordance with driver's intention, and the driver changes a position of a wheel using a steering wheel. In addition, the steering device is made in any of a variety of ways, such as Hydraulic Power Steering (HPS) or Electronic Hydraulic Power Steering (EHPS) mechanism using hydraulic power, and Motor Driven Power Steering (MDPS) or Electronic Power Steering (EPS) which are power steering operation mechanisms used with the help of an electric motor, etc.

Recently, with the development of electronic technology, autonomous driving technology has been applied to vehicles, and the importance and concept of the steering wheel are changing. The autonomous driving technology is usually regulated from level 0 to level 5.

In level 0, the driver entirely operates the vehicle, and the autonomous steering serves to assist in driving or in urgent matters. In level 1, the driver drives directly, but a device performs both steering and acceleration/deceleration only in a specific driving mode. In level 3, the device performs all vehicle controls in a specific driving mode, and the driver generally performs only when a request for device intervention is made. In level 4, the device performs all vehicle controls in a specific driving mode and no driver intervention is required. In level 5, the device performs entire driving.

Currently, the autonomous driving technology has reached level 3 or level 4, and level 5 is still in development. Therefore, even if the vehicle is operated in an autonomous driving mode, driver intervention is required to control the vehicle. For example, parking, lane changes, etc., require the driver intervention.

According to the above, there is a need for a new steering device that may be provided in a vehicle to which an autonomous driving system is applied.

SUMMARY

Aspects of the present disclosure provide a steering device and a transmission capable of controlling a vehicle. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle control system having an autonomous driving system may include a controller configured to determine whether a vehicle is operating in an autonomous driving mode or in a manual driving mode; and a steering device for adjusting a position of a wheel of the vehicle when the vehicle is operating in the manual driving mode. The steering device may comprise a knob configured to rotate about a rotation axis; a shaft connected to the knob, such that the shaft rotates about the rotation axis together with the knob by a rotational force transmitted from the knob; and an elastic part coupled to the shaft. In particular, when the shaft rotates from a reference position by the rotational force, the elastic part may be compressed, and when the rotational force is removed, the elastic part may be relaxed to return the shaft to the reference position.

The steering device may further comprise a rotating body coupled to the shaft and rotated about the rotation axis based on a rotation of the shaft; and a moving part formed on the rotating body to move a first end or a second end of the elastic part based on a rotation of the rotating body. As a distance between the first end of the elastic part and the second end of the elastic part is increased, the elastic part may be compressed, and as the elastic part is relaxed, the distance between the first end and the second end of the elastic part may be decreased. The steering device may comprise a first stopper disposed between the first end and the second end of the elastic part to support one of the first end or the second end when another of the first end or the second end is moved by the moving part; and at least one second stopper for limiting movement of the first end or the second end of the elastic part by the moving part. The steering device may comprise a damper coupled to the rotating body. The damper may rotate based on the rotation of the rotating body, and may generate a rotational resistance force during rotation.

The damper may comprise a damper gear unit coupled to the rotating body and configured to be rotated due to the rotation of the rotating body; a rotor connected to the damper gear and rotated together with the damper gear unit; and a damper accommodating part that accommodates at least a portion of the rotor. Further, the damper accommodating part may include an oil for generating the rotational resistance force between the damper accommodating part and the rotor.

The steering device may further comprise a sensor gear unit including a magnet and being coupled to and rotated by the rotating body; and a sensor unit configured to detect a rotational position of the shaft based on a change in a magnetic force of the magnet. The controller may be configured to adjust the position of the wheel of the vehicle based on the rotational position of the shaft which is detected by the sensor unit.

A housing may be further provided to accommodate the shaft, the rotating body, the moving part, a first stopper, and a second stopper, and to expose the knob to an exterior of the housing. The first stopper may be formed in the housing to be spaced apart from the shaft farther than the moving part is from the shaft.

According to another aspect of the present disclosure, a vehicle control system having an autonomous driving system may include a controller configured to determine whether a vehicle is operating in an autonomous driving mode or in a manual driving mode; a steering device for adjusting a position of a wheel of the vehicle when the vehicle is operating in the manual driving mode; and a transmission for selecting gear shifting stages of the vehicle. Further, the steering device may comprise a knob configured to rotate about a rotation axis and to adjust the position of the wheel; a shaft connected to the knob and rotated about the rotation axis together with the knob; and an elastic part coupled to the shaft. In particular, when the shaft rotates from a reference position by a rotational force transmitted from the knob, the elastic part may be compressed, and when the rotational force is removed, the elastic part may be relaxed to rotate the shaft to the reference position.

The transmission may comprise a plurality of shift buttons for selecting a shift stage among a plurality of shift stages; and a pressure sensing unit for detecting a pressure applied to one of the plurality of shift buttons to generate a signal corresponding to the selected shift stage. The controller may be configured to receive the signal and determine the selected shift stage to change the gear shift stages of the transmission of the vehicle.

A housing may be provided to accommodate the shaft and the pressure sensing part therewithin and to expose the plurality of shift buttons and the knob to the exterior thereof. The housing may comprise a base inserted into the shaft and including a support shaft for supporting the shaft; a lower housing disposed above the base and including an aperture through which the shaft passes; and an upper housing disposed above the lower housing. The upper housing may accommodate the pressure sensing unit within the housing, and may expose the plurality of shift buttons and the knob to the exterior of the housing.

A sensor unit may be further provided for detecting a rotational position of the shaft to adjust the position of the wheel of the vehicle. Further, the controller may be configured to adjust the position of the wheel of the vehicle based on the rotational position of the shaft which is detected by the sensor unit.

A vehicle control system according to exemplary embodiments of the present disclosure may have one or more of the following benefits. The vehicle control system may efficiently adjust a position of a wheel of a vehicle as an elastic part coupled to a shaft is compressed and relaxed. The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
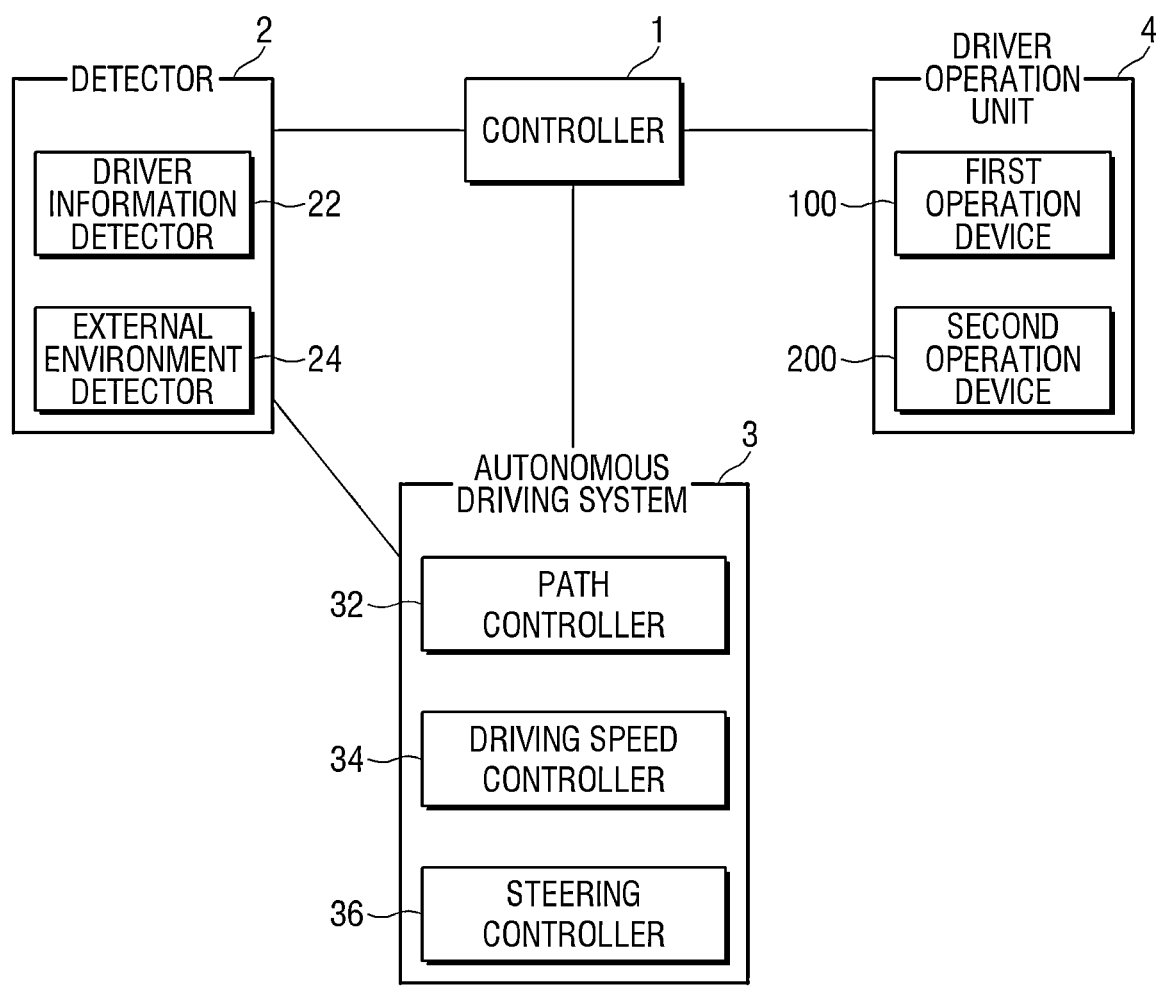
FIG. 1 is a block diagram schematically showing a vehicle control system according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, exemplary embodiments of a vehicle control system according to the present disclosure will be described in detail based on the attached exemplary drawings.

Figure 2:
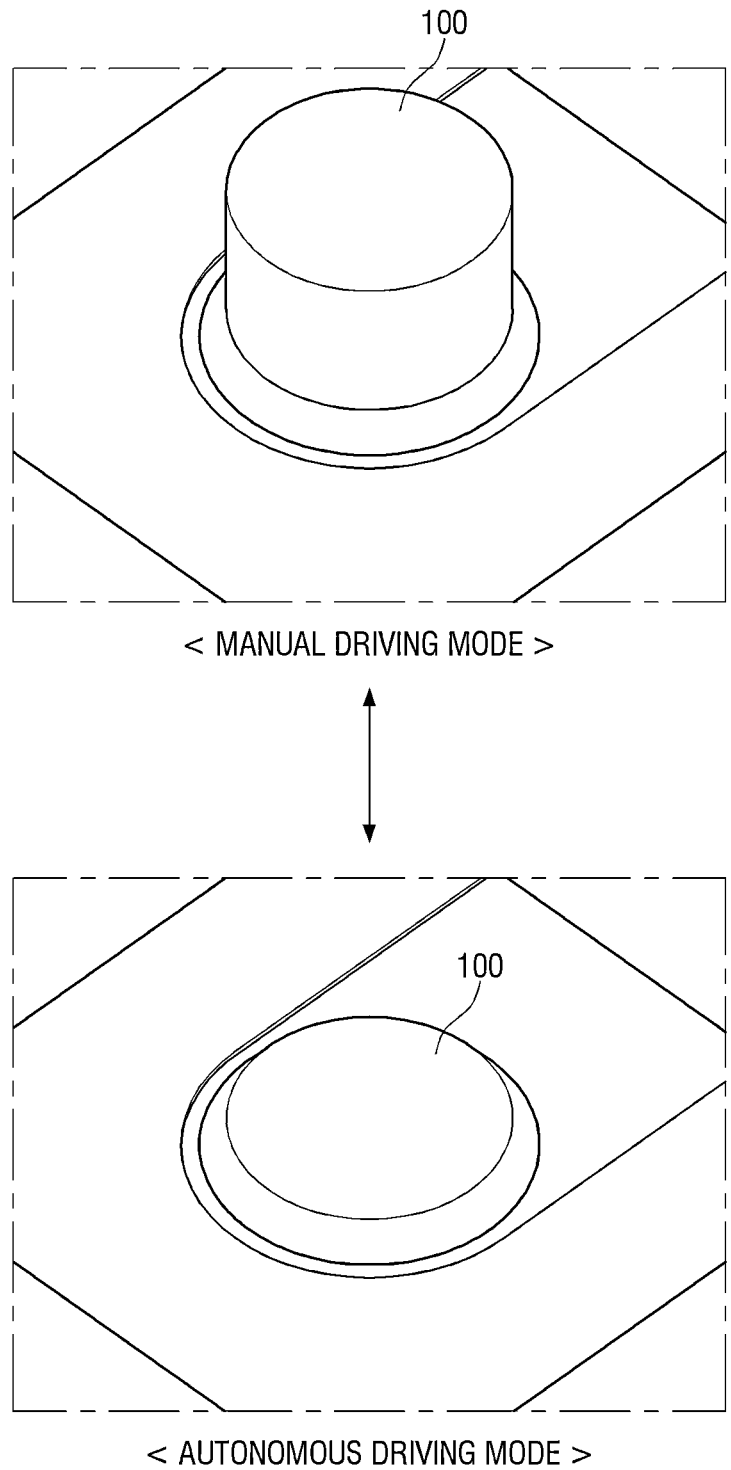
FIG. 2 is a view showing a state in which a first operation device according to the exemplary embodiment of the present disclosure is popped up and popped down.

FIG. 1 is a block diagram schematically showing the vehicle control system according to an exemplary embodiment of the present disclosure, and FIG. 2 is a view showing a state in which a first operation device according to the exemplary embodiment of the present disclosure is popped up and popped down. Referring to FIG. 1, the vehicle control system according to the exemplary embodiment of the present disclosure may include a controller 1, a detector 2, an autonomous driving system 3, and a driver operation unit 4.

The controller 1 may be configured to determine a driving mode selected by a driver among a plurality of driving modes, and may control the vehicle control system in accordance with the selected driving mode. The driving mode may include a first driving mode and a second driving mode, but the driving mode that can be selected by the controller 1 is not limited thereto. The driver may select one of the plurality of driving modes by operation of various operation units such as buttons, switches, levers, and pedals provided in the vehicle, and it may determine the driving mode selected by the driver from an input signal depending on the driver's operation. For example, when a button or a device preset by the driver is operated in the first driving mode, the controller 1 may be configured to determine that the second driving mode is selected. Similarly, when a pedal is operated in the second driving mode, it may determine that the first driving mode is selected.

In an exemplary embodiment of the present disclosure, the driver may select the driving mode by operating the various operation units described above. However, the present disclosure is not limited thereto, and the driver may select the driving mode via voice recognition or gesture recognition. In addition, the driving mode may be determined based on a subject who controls the operation of the vehicle. In an exemplary embodiment of the present disclosure, the first driving mode may correspond to a manual driving mode, and the second driving mode may correspond to an autonomous driving mode.

The manual driving mode may be a mode in which the driver controls the operation of the vehicle in most situations by operating a steering device, a transmission, an accelerator pedal, a brake pedal, or the like, and may be understood as a driving mode in which the subject who controls the operation of the vehicle is the driver. The autonomous driving mode may be understood as a driving mode in which the vehicle performs all controls related to the driving on its own or autonomously without driver intervention in most situations, except in limited situations where the manual driving mode is required (for example, a narrow alley or off-road). To this end, when the autonomous driving mode is selected, the controller 1 according to the present disclosure may be configured to allow the vehicle to be driven by an autonomous driving system 3.

In the exemplary embodiment of the present disclosure as described above, the driver may select the driving mode. However, the present disclosure is not limited thereto, and the driving mode may be selected based on a driving environment of the vehicle, and the controller 1 may be configured to change the driving mode depending on the operating status of the vehicle. For example, when drowsy driving is detected via the driver's pupil tracking, face recognition, or the like in the manual driving mode, the controller 1 may be configured to change to the autonomous driving mode. In addition, in the autonomous driving mode, when weather conditions around the vehicle are not suitable for the autonomous driving mode due to, for example, fog, rain, snow, or the like, or when road conditions are not suitable for the autonomous driving mode due to, for example, a narrow alley, off road, or the like, the controller 1 may be configured to change to the manual driving mode.

The detector may include a driver information detector 22 that detects a driver's state using various sensors mounted on the vehicle, and an external environment detector 24 that may detect surrounding objects, road conditions, and weather conditions around the vehicle. The driver information detector 22 may be implemented as, for example, an imaging device (e.g., a camera), a haptic device, or the like, and may detect the driver's face, pulse, pupil, or the like to detect drowsy driving.

The external environment detector 24 may detect objects around the vehicle using an imaging device (e.g., a camera), a radar sensor, a LIDAR sensor, an ultrasonic sensor, or the like, and may detect a road situation (e.g., a highway, an alleyway, an off-road, or the like) where the vehicle is located by mapping the vehicle's location measured based on a satellite navigation system such as GPS to the map data. Accordingly, according to the present disclosure, the external environment detector 24 may store the map data in advance. However, the present disclosure is not limited thereto, and the map data may be provided via wired or wireless communication. In addition, the external environment detector 24 may detect weather conditions around the vehicle based on weather information provided through wired or wireless communication.

Detection results of the sensors described above may be used in forward collision-avoidance assist (FCA), lane keeping assist (LKA), blind spot collision warning (BCW), adaptive cruise control (ACC), or the like to control the acceleration/deceleration and the proceeding direction of the vehicle. Accordingly, as described above, the controller 1 may be configured to switch to the autonomous driving mode or the manual driving mode based on the driver's state and surrounding situations detected by the detector 2.

The autonomous driving system may help the vehicle follow an optimized autonomous driving path, and may include a path controller, a driving speed controller, and a steering controller to control at least one of steering and braking for autonomous driving of the vehicle.

The path controller 32 may be configured to detect an optimal path depending on at least one of the surrounding objects and road situations detected by the external environment detector 24 to generate a driving path. Accordingly, it may be connected to the detector to receive various data.

The driving speed controller 34 may be configured to control a driving speed of the vehicle to allow the vehicle to autonomously drive along the driving path generated by the path controller. Accordingly, the driving speed controller 34 may be configured to control autonomous braking such as emergency braking (AEB), anti-lock brake system (ABS), or the like as well as an internal combustion engine or motor that generates power for autonomous driving of the vehicle to control the acceleration and deceleration of the vehicle.

The steering controller 36 may be configured to control the driving direction of the vehicle along the driving path generated by the path controller 32. Accordingly, the steering controller 36 may be configured to control motor driven power steering (MDPS), active front steering (AFS), rear wheel steering (RWS) for controlling the driving direction of the vehicle.

The driver operation unit 4 may be configured to be operated by the driver in the manual driving mode, and may include a first operation device 100 and a second operation device 200. Meanwhile, the first operation device 100 may be implemented as a steering device, and the second operation device 200 may be implemented as a transmission, but the present disclosure is not limited thereto.

At least a portion of the first operation device 100 and the second operation device 200 may be accommodated in a housing. Specifically, the first operation device 100 and the second operation device 200 may be installed between a center fascia and a console box of the vehicle. However, the present disclosure is not limited thereto, and the first operation device 100 and second operation device 200 for the vehicle according to the present disclosure may be installed at various positions with driver accessibility.

In addition, the controller 1 may be configured to move at least one of the first operation device 100 or the second operation device 200 from a first position to a second position when the driving mode is switched from the autonomous driving mode to the manual driving mode by the controller 1. It may mean that the first position is a position accommodated in the housing, and the second position may be defined as a position popped up in the housing, but the present disclosure is not limited thereto. For example, as shown in FIG. 2, the first operation device 100 may be disposed at a popped state (e.g., a raised state, a protruding state) in the manual driving mode, and the first operation device 100 may be disposed at a popped down state (e.g., a lowered state, a recessed state, a withdrawn state, a flush state, a stored state) and accommodated in a console when the controller 1 changes to the autonomous driving mode.

Further, the controller 1 may be configured to fix or lock the first operation device 100 and the second operation device 200 in the autonomous driving mode to prevent the driver from operating it. In this case, a fixing part that is controlled by the controller 1 and fixes the first operation device 100 and the second operation device 200 may be further provided. In addition, when in the autonomous driving mode, even if the first operation device 100 and/or the second operation device 200 is operated by the driver, the vehicle may be configured to override the driver operation and may remain being controlled by the autonomous driving system 3.

Figure 3:
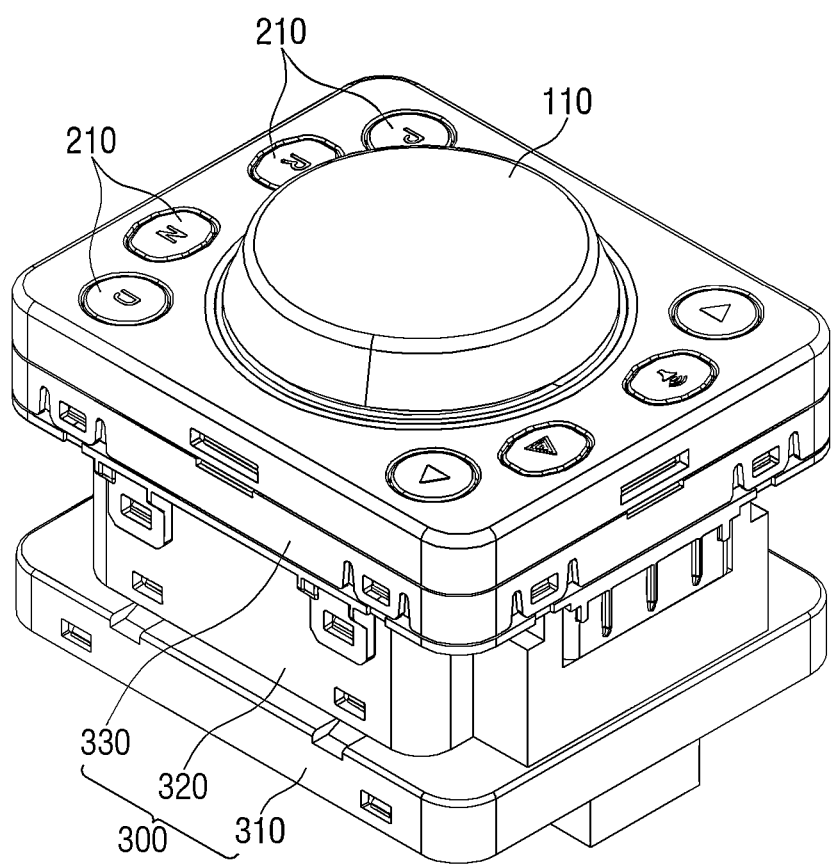
FIG. 3 is a view showing a steering device and a transmission applied to a vehicle control system according to the exemplary embodiment of the present disclosure.
Figure 4:
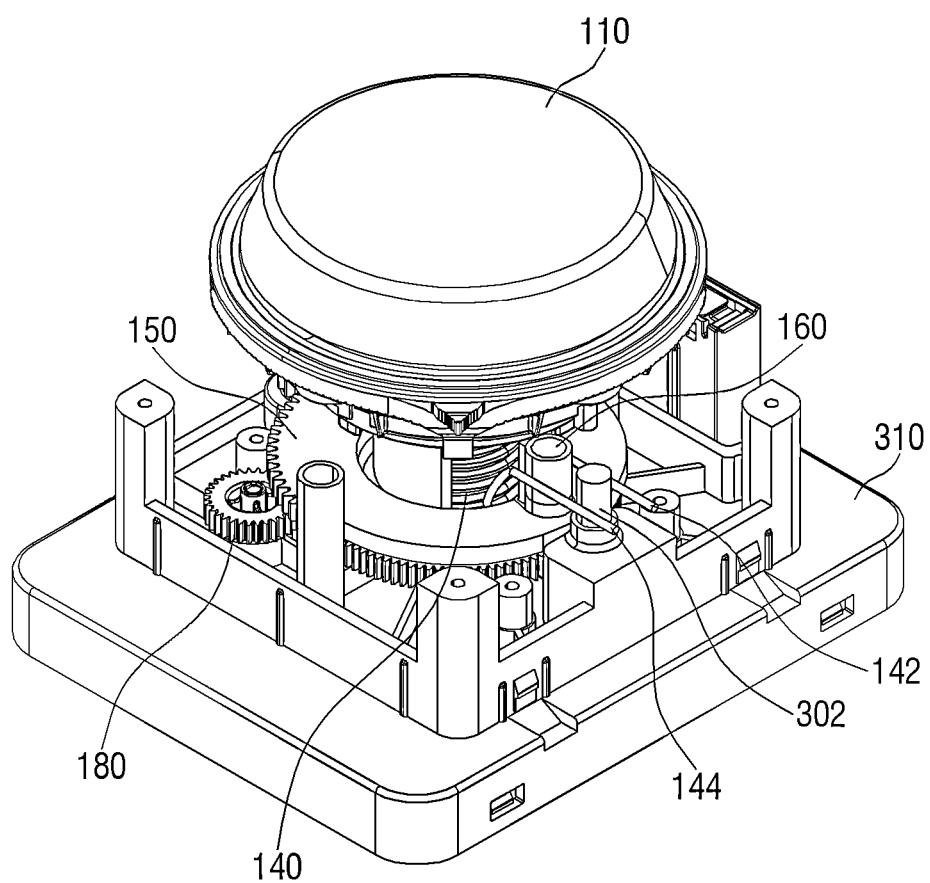
FIGS. 4 to 7 are views showing the steering device of the vehicle control system according to the exemplary embodiment of the present disclosure with a portion of a housing removed.
Figure 5:
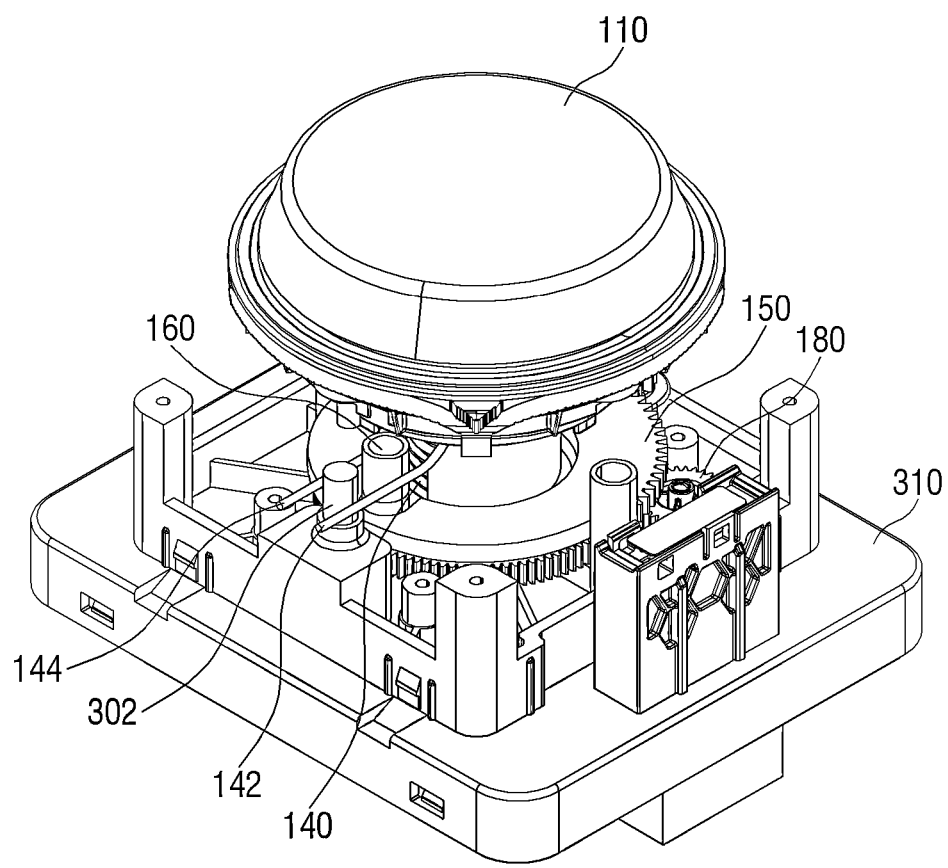
Figure 6:
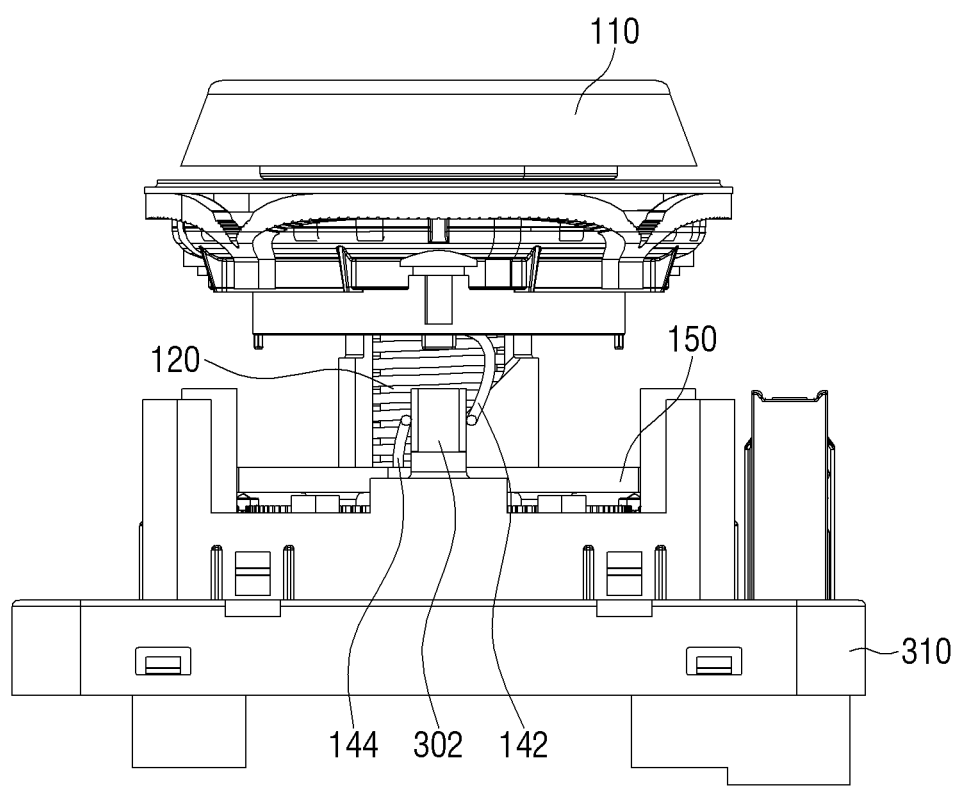
Figure 7:
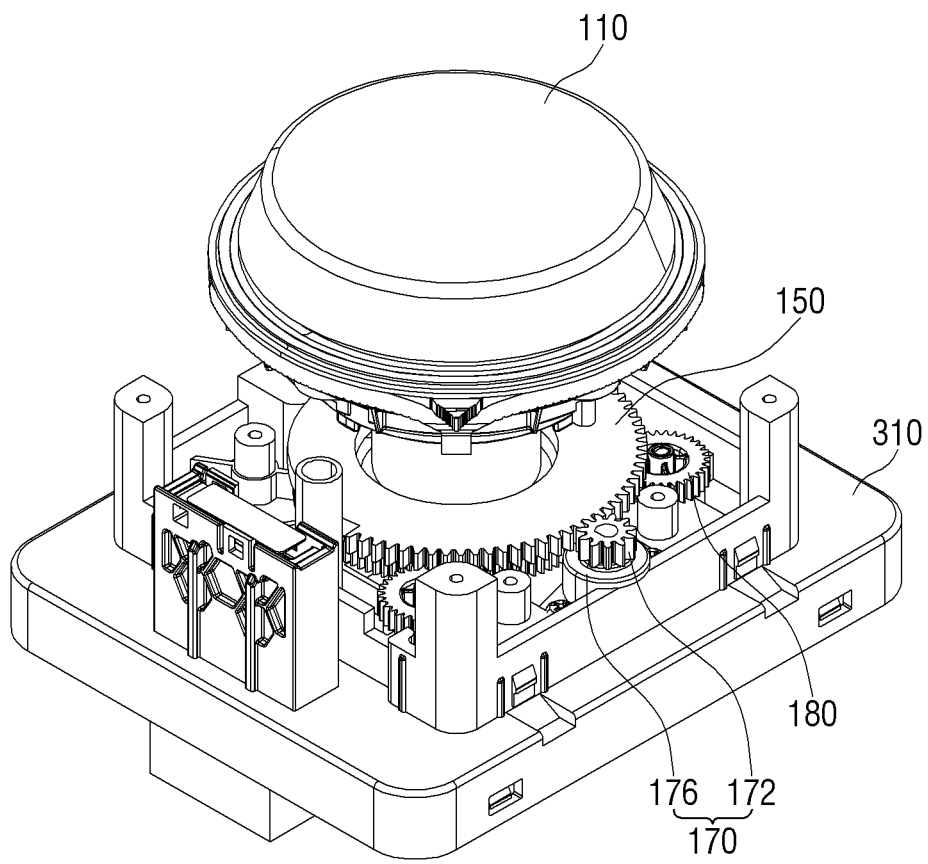

FIG. 3 is a view showing the steering device and the transmission applied to the vehicle control system according to the exemplary embodiment of the present disclosure, and FIGS. 4 to 7 are views of the steering device of the vehicle control system according to the exemplary embodiment of the present disclosure shown with a portion of the housing removed for illustration purposes.

The controller 1 may be configured to determine whether the vehicle is in the manual driving mode or in the autonomous driving mode, as described above, and may be configured to control the first operation device (i.e., the steering device) 100 and the second operation device (i.e., the transmission) 200, which will be described below. In addition, in the manual driving mode, the controller 1 may be configured to control such that the first operation device (i.e., the steering device) 100 and the second operation device (i.e., the transmission) 200 are operable. Herein, the first operation device and the steering device may be used interchangeably; and the second operation device and the transmission may be used interchangeably. However, in some implementations, the first operation device and the second operation device may be implemented as other functions.

Referring to FIGS. 3-7 and 11-13, the steering device 100 may be configured to change a position of a wheel (e.g., an orientation of front wheels, rear wheels, or both) of the vehicle, and may include a knob 110, a shaft 120, a sensor unit 130, an elastic part 140, a rotating body 150, a moving part 160, a first stopper 302, and a second stopper 304.

The knob 110 may be configured to rotate about a rotation axis and to change the position of the wheel of the vehicle, and may be formed to allow the driver to touch it with a hand. Therefore, as the driver rotates the knob 110, the position of the wheel of the vehicle may be adjusted. For example, when the knob 110 is rotated clockwise or counterclockwise about the rotation axis, the wheels of the vehicle may also rotate clockwise or counterclockwise correspondingly. Meanwhile, among components of the steering device 100, the knob 110 may be provided to be exposed to the cabin space of the vehicle.

The shaft 120 may be connected to the knob 110 and configured to rotate about the rotation axis with the knob 110 by a rotational force transmitted from the knob 110. Accordingly, when the knob 110 is rotated clockwise, the shaft 120 may be rotated clockwise, and when the knob 110 is rotated counterclockwise, the shaft 120 may be rotated counterclockwise. In addition, the shaft 120 may be disposed below the knob 110. The sensor unit 130 may detect a rotational position of the shaft 120. Accordingly, the controller 1 may be configured to change the position of the wheel of the vehicle depending on the rotational position detected by the sensor unit 130.

The elastic part 140 may be coupled to the shaft 120. Accordingly, the elastic part 140 may be compressed when the shaft 120 rotates from a reference position by the rotational force, and the elastic part 140 may be relaxed to return the shaft 120 to the reference position when the rotational force is removed. Here, the reference position may refer to a position where the knob 110 and the shaft 120 rest with no rotational force applied. For example, when the driver rotates the knob 110 counterclockwise by a hand and the rotational force is transmitted to the shaft 120, the elastic part 140 may be compressed. When the driver releases the hand off from the knob 110, the rotational force may be removed. As a result, the elastic part 140 may rotate the shaft 120 clockwise to return the shaft 120 to the reference position due to the elastic restoration force thereof. According to the above, due to the steering device 100 using the compression and relaxation characteristics of the elastic part 140, the vehicle control system of the present disclosure may change the position of the wheel of the vehicle when necessary in the manual driving mode.

The elastic part 140 may be formed to extend from a first end 142 to a second end 144 to surround the shaft 120, in which the positions of the first end 142 and the second end 144 may be formed at positions radially spaced apart from the shaft 120. For example, the elastic part 140 may be implemented as a torsion spring. However, the present disclosure is not limited thereto.

Accordingly, when a distance between the first end 142 of the elastic part 140 and the second end 144 of the elastic part 140 is increased, the elastic part 140 may be compressed. On the other hand, when the elastic part 140 is relaxed, the distance between the first end 142 of the elastic part 140 and the second end 144 of the elastic part 140 may be decreased. This will be described below in detail.

The rotating body 150 may be connected to the shaft 120 and may rotate about the rotation axis according to the rotation of the shaft 120. Therefore, the rotating body 150 may also be rotated with the shaft 120 by the rotational force transmitted from the knob 110. The rotating body 150 may be disposed under the shaft 120 and may be formed to include at least one gear. For example, as described in FIG. 5, the rotating body 150 may include two gears. The teeth of each gear may be formed on a partial circumference of gears, but the present disclosure is not limited thereto.

The moving part 160 may protrude from the rotating body 150 and may move the first end 142 or the second end 144 of the elastic part 140 according to the rotation of the gear. Specifically, the moving part 160 may be disposed between the second end 144 and the first end 142 of the elastic part 140. The position of the moving part 160 may be changed as the gear rotates. Therefore, the moving part 160 may move the first end 142 or the second end 144 of the elastic part 140 toward a rotation direction of the rotating body 150.

The first stopper 302 may be provided between the first end 142 and the second end 144 of the elastic part 140. Specifically, when the shaft 120 is at the reference position, the first end 142 and the second end 144 of the elastic part 140 may be in contact with the first stopper 302. The first stopper 302 may support one of the first end 142 or the second end 144 of the elastic part 140 when the other is moved by the moving part 160. For example, when the gear moves counterclockwise by the rotational force, the moving part 160 may push the first end 142 of the elastic part 140 counterclockwise, and the first stopper 302 may support the second end 144 of the elastic part 140. Accordingly, the distance between the first end 142 and the second end 144 of the elastic part 140 may be increased by the moving part 160 and the first stopper 302, to cause the elastic part 140 to be compressed. Further, as the elastic part 140 is relaxed, the distance between the first end 142 and the second end 144 of the elastic part 140 may be decreased.

The second stopper 304 may limit the movement of the first end 142 or the second end 144 of the elastic part 140 by the moving part 160, and may be provided in one or more, so that the first end 142 or the second end 144 of the elastic part 140 may be moved between the first stopper 302 and the one or more second stoppers 304. In other words, as the movement of the first end 142 or the second end 144 of the elastic part 140 is limited by the second stopper 304, a rotational range of the rotating body 150, the shaft 120, and the knob 110 may be limited. Accordingly, a rotational range within which the driver may rotate the knob 110 may be determined by positions of the first stopper 302 and the one or more second stoppers 304. Meanwhile, the first stopper 302 and the second stopper 304 may be provided in the housing 300 to be described below, but the positions of the first stopper 302 and/or the second stopper 304 are not limited thereto. In addition, the moving part 160, the first stopper 302, and the second stopper 304 may be formed of a rubber material. Accordingly, when they contact the first end 142 or the second end 144 of the elastic part 140, noise, impact, or the like may be reduced.

Hereinafter, the movement of the first end 142 and the second end 144 of the elastic part 140 will be described in counterclockwise and clockwise directions, respectively. FIGS. 8A to 8E show the movement of the first end 142 and the second end 144 of the elastic part due to the rotation of the shaft 120 according to the exemplary embodiment of the present disclosure, and FIG. 9 is a view showing a force generated with respect to a rotational position of the shaft.

Figure 8A:
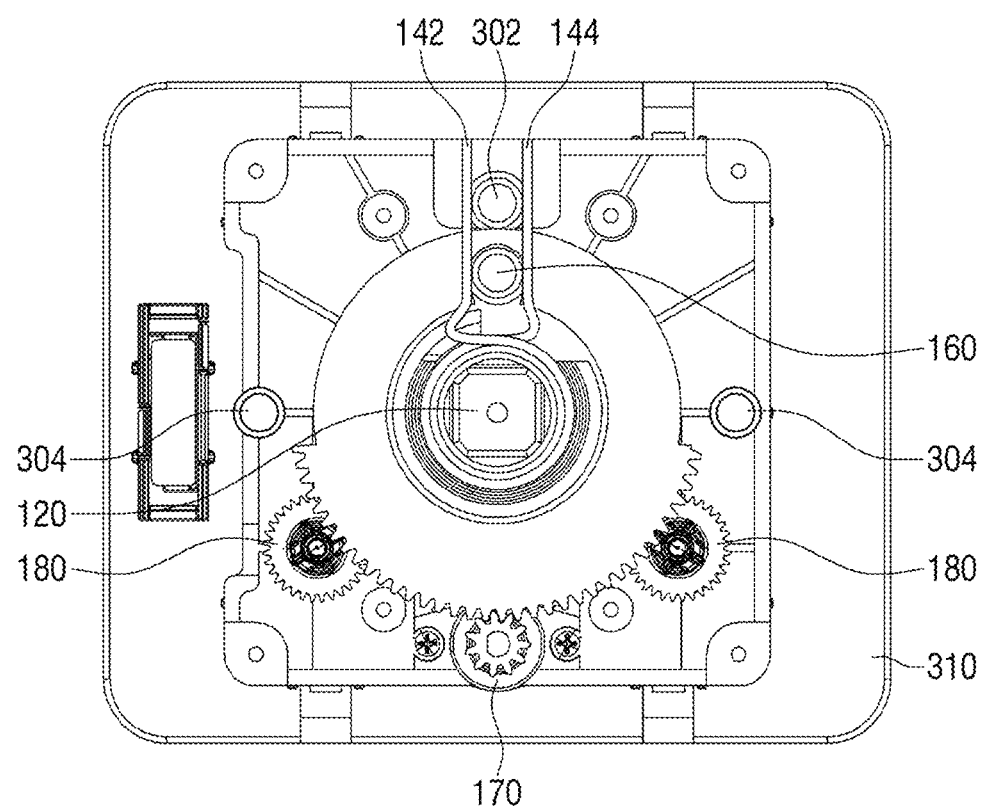
FIGS. 8A to 8E are views showing the movement of a first end and a second end of the elastic part due to the rotation of a shaft according to the exemplary embodiment of the present disclosure.
Figure 8B:
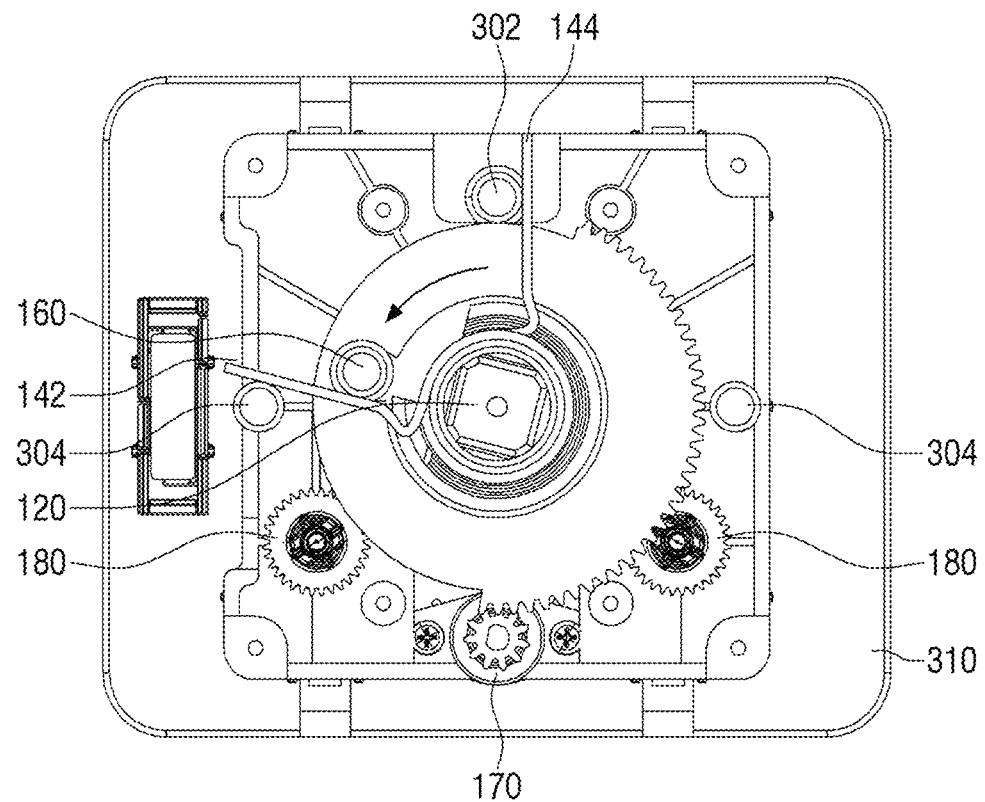
Figure 9:
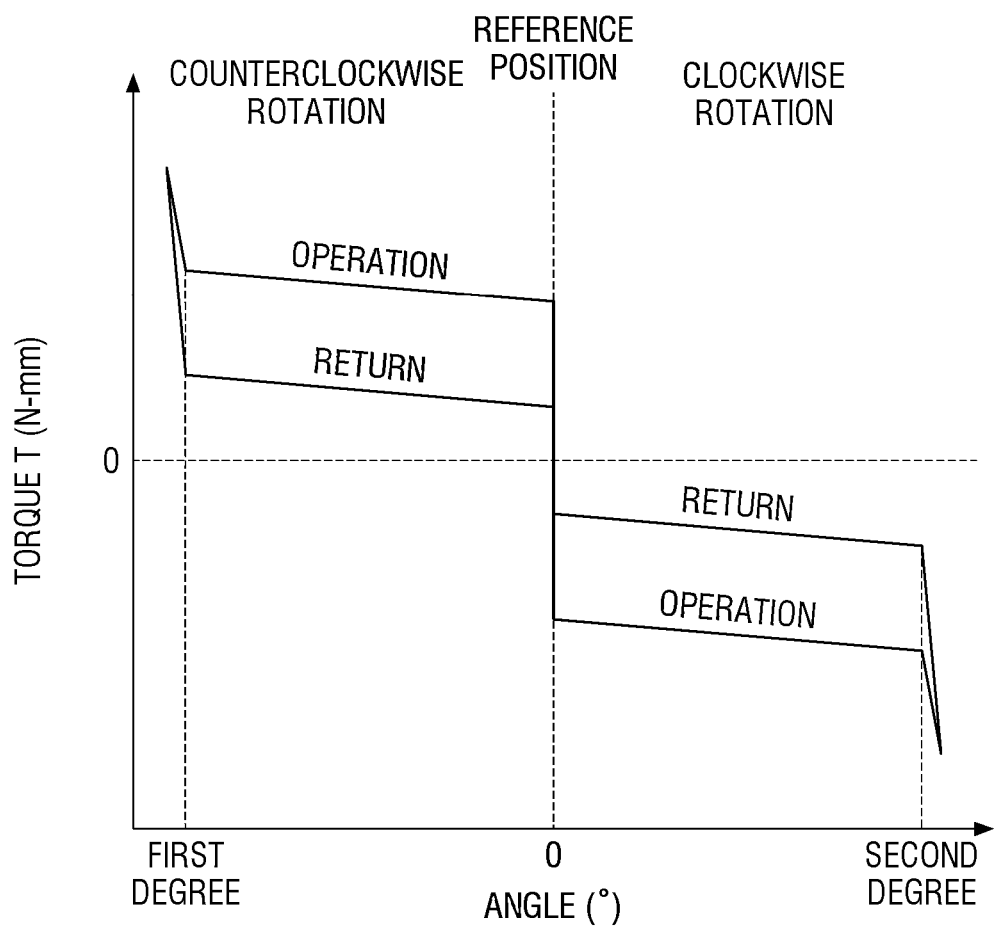
FIG. 9 is a view showing a force generated with respect to a position of rotation of the shaft.

Since the shaft 120 is at the reference position without the rotational force applied, the moving part 160 and the first stopper 302 may contact both the first end 142 and the second end 144 of the elastic part 140, as shown in FIG. 8A. Subsequently, when a counterclockwise rotational force is generated from the knob 110, the shaft 120 may rotate counterclockwise. Therefore, as shown in FIG. 8B, the moving part 160 may compress the elastic part 140 by pushing the first end 142 of the elastic part 140 counterclockwise. For example, when a rotational range of the first end 142 of the elastic part 140 is a first angle set by the first stopper 302 and the second stopper 304 that is disposed counterclockwise from the first stopper 302, the rotational range in the counterclockwise direction of the knob 110 and the shaft 120 may also be limited to the first angle.

Figure 8C:
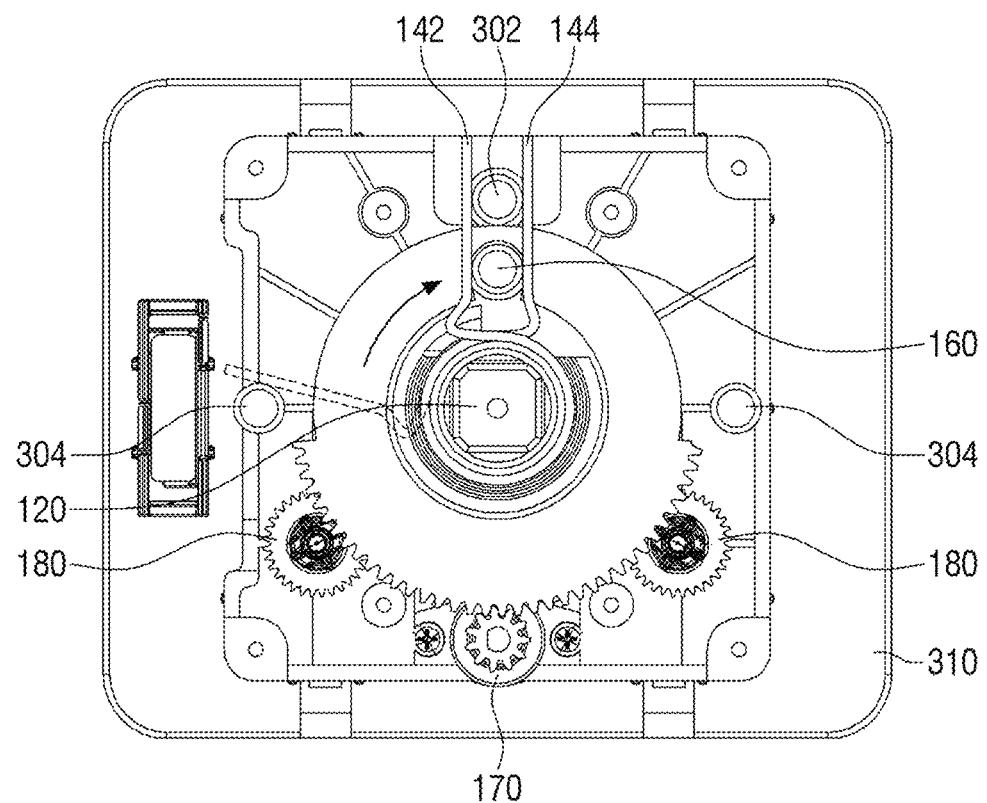

When the rotational force is removed, the elastic part 140 may be relaxed. Therefore, as shown in FIG. 8C, the first end 142 of the elastic part 140 may move the moving part 160, and thus, the gear may be rotated clockwise and may cause the shaft 120 and the knob 110 to be rotated clockwise. Therefore, as the elastic part 140 is relaxed, the shaft 120 may return to the reference position.

Figure 8D:
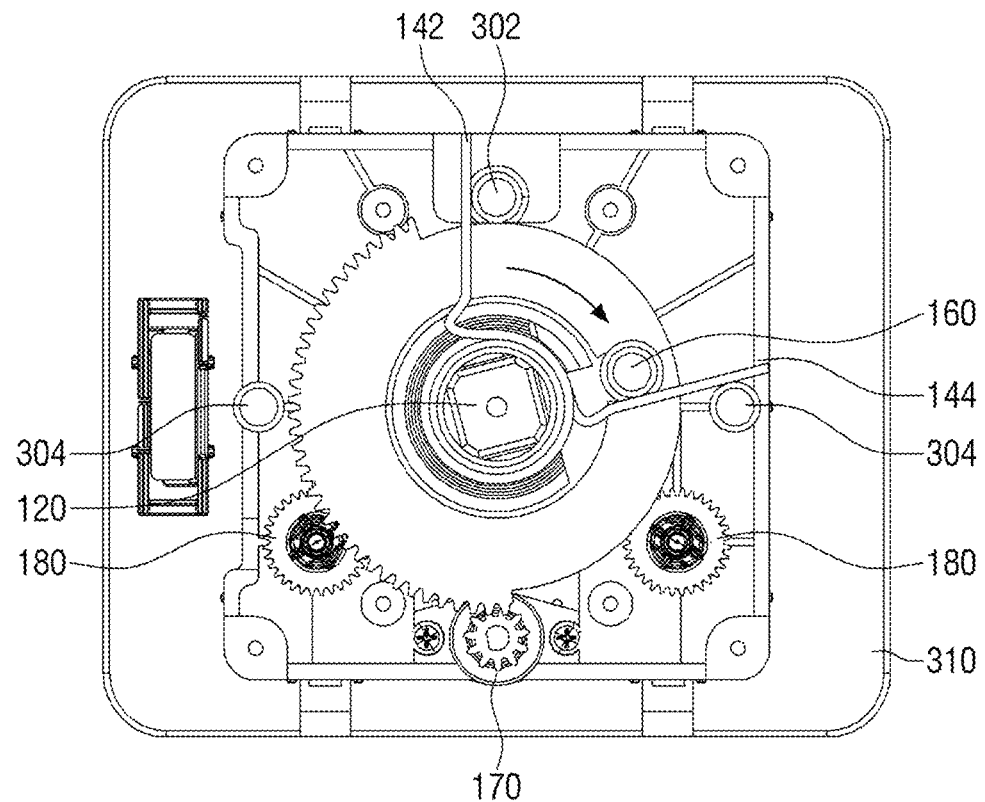

Subsequently, as the shaft 120 rotates clockwise by the rotational force as shown in FIG. 8D, the moving part 160 may also be moved clockwise to push the second end 144 of the elastic part 140 to compress the elastic part 140. For example, when the rotational range of the second end 144 of the elastic part 140 is a second angle set by the first stopper 302 and the second stopper 304 that is disposed clockwise from the first stopper 302, the rotational range formed in the clockwise direction of the knob 110 and the shaft 120 may also be limited to the second angle. Herein, the elastic part 140 has been described to be compressed when the first end 142 or the second end 144 is rotated. However, the present disclosure is not limited to such configuration, and the elastic part 140 may be elastically extended when the first end 142 or the second end 144 is rotated. Whether the elastic part 140 is compressed or extended may depend on the winding direction of the elastic part 140 and/or the relative positions between the first end 142, the second end 144, the moving part 160, and the first stopper 302.

Figure 8E:
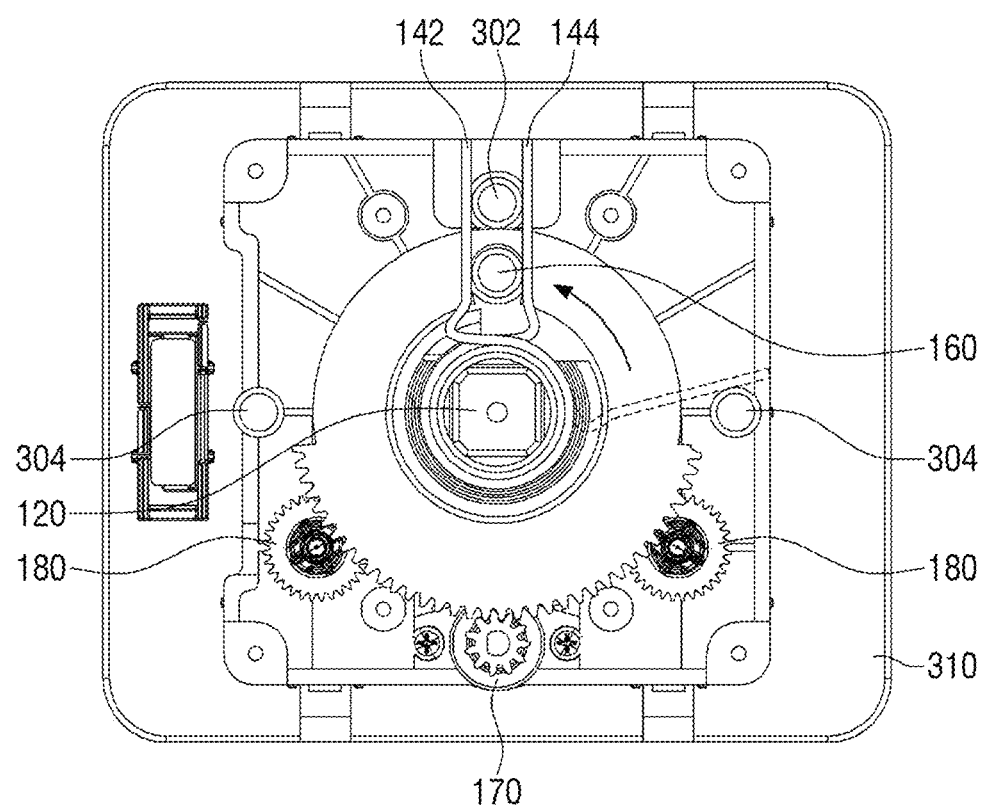

When the rotational force is removed, the elastic part 140 may be relaxed. Therefore, as shown in FIG. 8E, the second end 142 of the elastic part 140 may move the moving part 160, and thus, the gear may be rotated counterclockwise and may cause the shaft 120 and the knob 110 to be rotated counterclockwise. Therefore, as the elastic part 140 is relaxed, the shaft 120 may return to the reference position.

In some embodiments, the first angle and the second angle described above may be substantially same. In some embodiments, they may be different.

As the elastic part 140 is provided on the shaft 120 of the steering device 100, the rotational force (e.g., torque) depending on a rotation angle of the shaft 120 may be generated as shown in FIG. 9. Specifically, the rotational force (OPERATION) for rotating the shaft 120 by the elastic part 140 may be increased as the rotational angle of the shaft 120 increases or decreases. On the contrary, even if the rotational force is removed, the rotational force (RETURN) due to the restoration of the elastic part 140 that pushes the moving part 160 may be reduced as the shaft 120 is returned. In addition, the rotational force (OPERATION) for rotating the shaft 120 may be greater than the rotational force (RETURN) due to the relaxation of the elastic part. Therefore, as shown in FIG. 9, a torque graph with respect to the rotation angle may exhibit a hysteresis.

In case the elastic part 140 is not provided, the shaft 120 may be rotated even with a minimal rotational force. Therefore, the wheels of the vehicle may be abruptly rotated, which may cause safety problems. Accordingly, when the shaft 120 is rotated due to the compression and relaxation of the elastic part 140 as in the present disclosure, the shaft 120 may be prevented from abruptly rotating and may allow the driver to safely adjust the position of the wheel.

Figure 10:
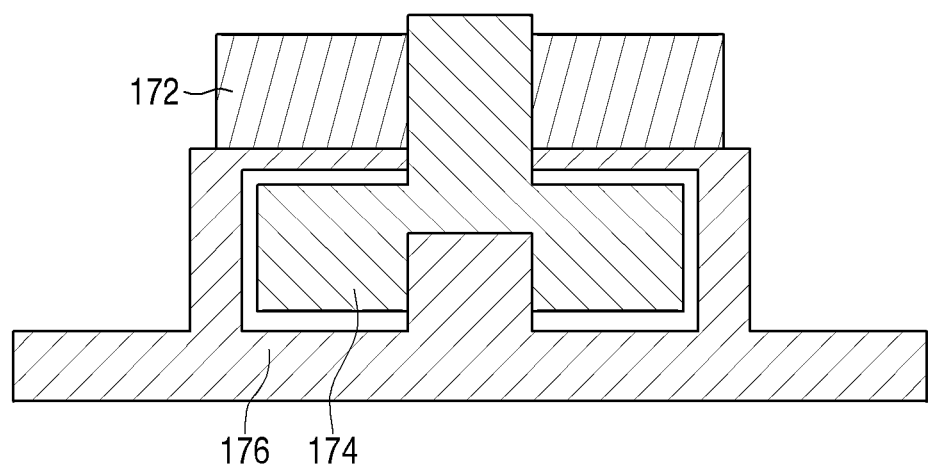
FIG. 10 is a sectional view showing a damper according to the exemplary embodiment of the present disclosure.

FIG. 10 is a sectional view showing a damper according to the exemplary embodiment of the present disclosure. Referring to FIGS. 3 to 10 again, the steering device 100 according to the exemplary embodiment of the present disclosure may further include a damper 170 and a sensor gear unit 180.

The damper 170 may be coupled (e.g., gear-coupled) to the rotating body 150 described above, rotate depending on the rotation of the rotating body 150, and generate a resistance/friction force when rotating. Accordingly, due to the elastic part 140 and the damper 170, the driver may safely steer the wheel of the vehicle by rotating the knob 110.

Specifically, the damper 170 may include a damper gear unit 172 that is coupled to the rotating body 150 and rotates, a rotor 174 that is connected to the damper gear unit 172 and rotates simultaneously, and a damper accommodating part 176 for accommodating at least a portion of the rotor 174. The damper accommodating part 176 may include oil therein to generate a rotational resistance force between the damper accommodating part 176 and the rotor 174. For example, silicone oil having a high resistance viscosity may be used as the oil, but the present disclosure is not limited thereto.

Accordingly, when the rotating body 150 is rotated, the damper gear unit 172 which is engaged with the rotating body 150 may be rotated to allow the rotor 174 to be rotated together. However, the friction/resistance force is generated by the oil between the rotor 174 and the damper accommodating part 176, and thus the friction/resistance force may be applied during the rotation of the rotating body 150. Accordingly, the driver may steer the position of the wheels of the vehicle more safely and in a more controlled manner due to the elastic part 140 and the friction/resistance force from the oil in the knob 110. Consequently, the damper 170 may reduce a rotational speed of the rotating body 150 to prevent the wheels from being rapidly rotated, and to improve stability.

The sensor gear unit 180 may include a magnet, and may be configured to be engaged with the rotating body 150 and to rotate simultaneously when the rotating body 150 rotates. The sensor unit 130 may detect the rotational position of the shaft 120 based on the change in the magnetic force of the magnet. In some implementations, the sensor unit 130 may include a Hall sensor.

At least a portion of the steering device 100 of the present disclosure may be accommodated in the housing 300. Specifically, the housing 300 may accommodate the shaft 120, the rotating body 150, the moving part 160, the first stopper 302, the second stopper 304, the sensor gear unit 180, and the sensor unit 130, and may expose the knob 110 to the exterior of the housing 300.

Further, the first stopper 302, the second stopper 304, and the sensor unit 130 may be disposed in the housing 300, but the present disclosure is not limited thereto. In addition, the first stopper 302 may be formed in the housing 300 to be spaced apart from the shaft 120 farther than the moving part 160 is from the shaft 120.

Figure 11:
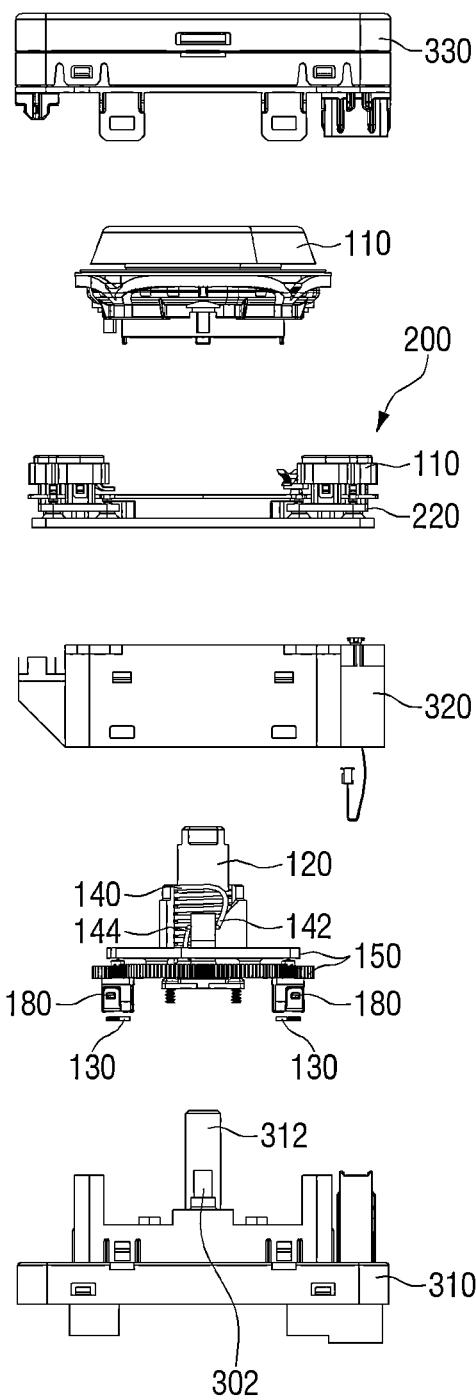
FIGS. 11 to 13 are exploded perspective views showing the steering device and the transmission according to the exemplary embodiment of the present disclosure.
Figure 12:
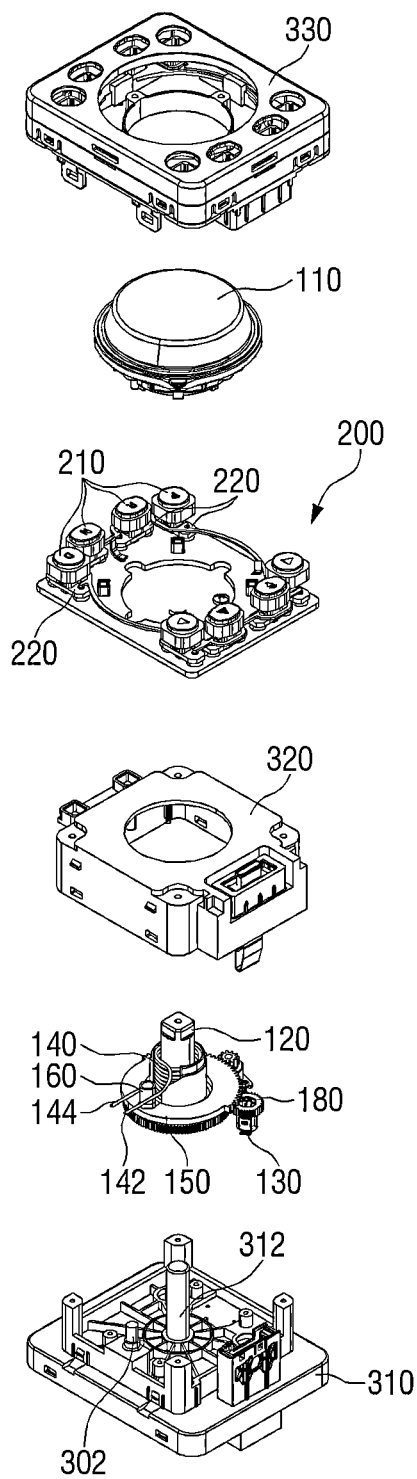
Figure 13:
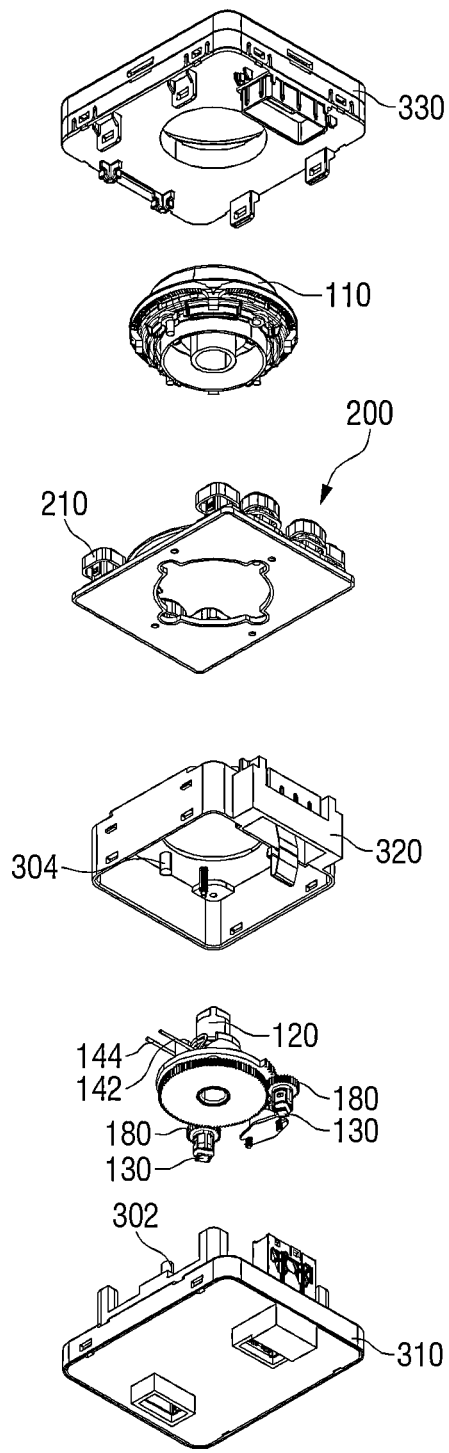

FIGS. 11 to 13 are exploded perspective views showing the steering device and the transmission according to the exemplary embodiment of the present disclosure. As shown in FIGS. 1 and 11-13, the vehicle control system according to the present disclosure may further include the transmission 200. The transmission 200 may be provided for selecting gear shift stages of the vehicle, and may include a plurality of shift buttons 210 and a pressure sensing unit 220. Further, the plurality of shift buttons 210 may be configured to be operable (e.g., activated) only in the manual driving mode by the controller. However, the present disclosure is not limited thereto.

The plurality of shift buttons 210 may be provided for selecting one of a plurality of shift stages, and may be configured to be pressed by the driver. Specifically, the shift buttons 210 may include each button that corresponds to parking (P), reverse (R), neutral (N), and drive (D) stages, respectively.

The pressure sensing unit 220 may be provided in plural, facing a direction of the plurality of shift buttons, and may detect a pressure applied to one of the plurality of shift buttons 210 and may generate a signal in accordance with the selected shift stage. Accordingly, the controller 1 may be configured to receive this signal, determine the selected shift stage, and change the shift stage of the transmission of the vehicle. In some embodiments, the pressure sensing unit 220 may include a rubber switch. However, the type of pressure sensing unit 220 is not limited thereto.

In this case, the housing 300 described above may accommodate the shaft 120 and the pressure sensing part 220, and expose the shift button 210 and the knob 110 to the exterior thereof. Specifically, the housing 300 may include a base 310, a lower housing 320, and an upper housing 330. The base 310 may include a support shaft 312 that may be inserted into a hollow spaced formed in the shaft 120 to support the shaft 120, and the first stopper 302 formed to protrude toward the lower housing 300. The base 310 may further accommodate the sensor unit 130.

The lower housing 320 may be disposed above the base 310, and an aperture through which the shaft 120 penetrates may be formed therein. Accordingly, the lower housing 320 may accommodate the rotating body 150, the sensor gear unit 180, and the damper 170. Further, at least one second stopper 304 may be formed on the lower housing 320 to protrude in a direction toward the base 310. However, the location of the second stopper 304 is not limited thereto. For example, the at least one second stopper 304 may be formed on the base 310.

The upper housing 330 may be disposed above the lower housing 320 to accommodate the pressure sensing part 220, and to expose the plurality of shift buttons 210 and the knob 110 to the exterior of the housing 300. In addition, as described above, the controller 1 may be configured to cause one or both of the shift button and the knob to pop up in the manual driving mode and to cause one or both of the shift button and the knob to be withdrawn in the housing 300 in the autonomous driving mode.

As described above, the vehicle control system according to the present disclosure that may be provided in a vehicle capable of an autonomous driving mode and a manual driving mode, a steering wheel that occupies a relatively large space may be unnecessary. In addition, since the vehicle control system includes both of the steering and the gear shifting functions required for the manual driving mode in a single housing, the interior space of the vehicle may be utilized more efficiently, and the cost may be reduced.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A vehicle control system having an autonomous driving system, comprising:
   a controller configured to determine whether a vehicle is operating in an autonomous driving mode or in a manual driving mode; and
   a steering device for adjusting a position of wheels of the vehicle when the vehicle is operating in the manual driving mode,
   wherein the steering device comprises:
      a knob configured to rotate about a rotation axis;
      a shaft connected to the knob, such that the shaft rotates about the rotation axis with the knob by a rotational force transmitted from the knob; and an elastic part coupled to the shaft,
wherein in response to the shaft being rotated from a reference position by the rotational force, the elastic part is compressed, and in response to the rotational force being removed, the elastic part causes the shaft to rotate and return to the reference position, thereby causing the position of the wheels of the vehicle to be centered.

2. The vehicle control system of claim 1, wherein the steering device further comprises:
a rotating body coupled to the shaft and rotated about the rotation axis based on a rotation of the shaft; and
a moving part formed on the rotating body to move a first end or a second end of the elastic part based on a rotation of the rotating body.

3. The vehicle control system of claim 2, wherein as a distance between the first end of the elastic part and the second end of the elastic part is increased, the elastic part is compressed, and as the elastic part is relaxed, the distance between the first end and the second end of the elastic part is decreased.

4. The vehicle control system of claim 2, wherein the steering device further comprises:
a first stopper disposed between the first end and the second end of the elastic part to support one of the first end or the second end when another of the first end or the second end is moved by the moving part; and
at least one second stopper for limiting movement of the first end or the second end of the elastic part by the moving part.

5. The vehicle control system of claim 2, wherein the steering device further comprises:
a damper coupled to the rotating body, wherein the damper rotates based on the rotation of the rotating body and generates a rotational resistance force during rotation.

6. The vehicle control system of claim 5, wherein the damper comprises:
a damper gear unit coupled to the rotating body and configured to be rotated due to the rotation of the rotating body;
a rotor connected to the damper gear unit and rotated together with the damper gear unit; and
a damper accommodating part that accommodates at least a portion of the rotor,
wherein the damper accommodating part includes an oil for generating the rotational resistance force between the damper accommodating part and the rotor.

7. The vehicle control system of claim 2, wherein the steering device further comprises:
a sensor gear unit including a magnet, wherein the sensor gear unit is coupled to and rotated by the rotating body; and
a sensor unit configured to detect a rotational position of the shaft based on a change in a magnetic force of the magnet,
wherein the controller is configured to adjust the position of the wheels of the vehicle based on the rotational position of the shaft which is detected by the sensor unit.

8. The vehicle control system of claim 2, further comprising:
a housing to accommodate the shaft, the rotating body, the moving part therewithin,
wherein the housing includes a first stopper and a second stopper therewithin, and
wherein the housing exposes the knob to an exterior of the housing.

9. The vehicle control system of claim 8, wherein the first stopper is formed in the housing to be spaced apart from the shaft farther than the moving part is from the shaft.

10. The vehicle control system of claim 1, further comprising:
a transmission for selecting gear shifting stages of the vehicle.

11. The vehicle control system of claim 10, wherein the transmission comprises:
a plurality of shift buttons for selecting a shift stage among a plurality of shift stages; and
a pressure sensing unit for detecting a pressure applied to one of the plurality of shift buttons to generate a signal corresponding to the selected shift stage.

12. The vehicle control system of claim 11, wherein the controller is configured to receive the signal and determine the selected shift stage to change the gear shifting stages of the transmission of the vehicle.

13. The vehicle control system of claim 11, further comprising:
a housing to accommodate the shaft and the pressure sensing unit therewithin and to expose the plurality of shift buttons and the knob to an exterior thereof.

14. The vehicle control system of claim 13, wherein the housing comprises:
a base inserted into the shaft and including a support shaft for supporting the shaft;
a lower housing disposed above the base and including an aperture through which the shaft passes; and
an upper housing disposed above the lower housing, wherein the upper housing accommodates the pressure sensing unit within the housing, and exposes the plurality of shift buttons and the knob to the exterior of the housing.

15. The vehicle control system of claim 10, further comprising:
a sensor unit configured to detect a rotational position of the shaft to adjust the position of the wheels of the vehicle,
wherein the controller is configured to adjust the position of the wheels of the vehicle based on the rotational position of the shaft which is detected by the sensor unit.

16. A vehicle control system comprising:
a controller configured to determine whether a vehicle is operating in an autonomous driving mode or in a manual driving mode; and
a steering device for adjusting a position of wheels of the vehicle when the vehicle is operating in the manual driving mode, wherein the steering device comprises:
a knob configured to be rotated about a rotation axis;
a shaft connected to the knob, such that the shaft is rotated about the rotation axis with the knob by a rotational force transmitted from the knob;
an elastic part coupled to the shaft, wherein the elastic part comprises a torsional spring having a first end and a second end;
a rotating body coupled to the shaft and configured to be rotated about the rotation axis with the shaft;
a moving part formed on the rotating body to move the first end or the second end of the elastic part based on a rotation of the rotating body; and
a first stopper disposed between the first end and the second end of the elastic part to support one of the first end or the second end when another of the first end or the second end is moved by the moving part, wherein, in response to the shaft being rotated in a counterclockwise direction away from a reference position by the rotational force, the second end of the elastic part is supported by the first stopper, and the first end of the elastic part is rotated in the counterclockwise direction by the moving part, thereby compressing the elastic part, wherein, in response to the rotational force being removed in a state in which the shaft is rotated in the counterclockwise direction, the first end of the elastic part rotates the moving part in a clockwise direction, thereby returning the shaft to the reference position, wherein, in response to the shaft being rotated in the clockwise direction away from the reference position by the rotational force, the first end of the elastic part is supported by the first stopper, and the second end of the elastic part is rotated in the clockwise direction by the moving part, thereby compressing the elastic part, and wherein, in response to the rotational force being removed in a state in which the shaft is rotated in the clockwise direction, the second end of the elastic part rotates the moving part in the counterclockwise direction, thereby returning the shaft to the reference position.

17. A vehicle control system comprising:

a controller configured to determine whether a vehicle is operating in an autonomous driving mode or in a manual driving mode; and a steering device for adjusting a position of wheels of the vehicle when the vehicle is operating in the manual driving mode, wherein the steering device comprises:

a knob configured to be rotated about a rotation axis;

a shaft connected to the knob, such that the shaft is rotated about the rotation axis with the knob by a rotational force transmitted from the knob;

an elastic part coupled to the shaft;

a rotating body coupled to the shaft and configured to be rotated about the rotation axis with the shaft, wherein the rotating body includes gear teeth on at least a portion of an outer circumference thereof; and a damper disposed to be gear-meshed with the gear teeth of the rotating body, wherein the damper is rotated based on a rotation of the rotating body and generates a rotational resistance force during rotation, wherein in response to the shaft being rotated from a reference position by the rotational force, the elastic part is compressed, and in response to the rotational force being removed, the elastic part causes the shaft to rotate and return to the reference position while the damper exerts the rotational resistance force.

18. The vehicle control system of claim 17, wherein the damper comprises:

a damper gear unit coupled to the gear teeth of the rotating body and configured to be rotated due to the rotation of the rotating body;

a rotor connected to the damper gear unit and rotated together with the damper gear unit; and a damper accommodating part that accommodates at least a portion of the rotor, wherein the damper accommodating part includes an oil for generating the rotational resistance force between the damper accommodating part and the rotor.

\* \* \* \* \*